July 3, 1928.
H. O. HEM
COIN OPERATED WEIGHING SCALE
Filed June 9, 1924      4 Sheets-Sheet 4
1,675,975
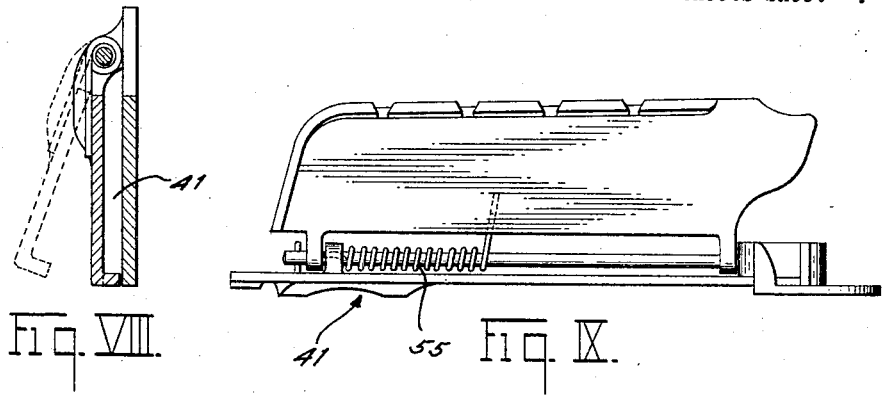
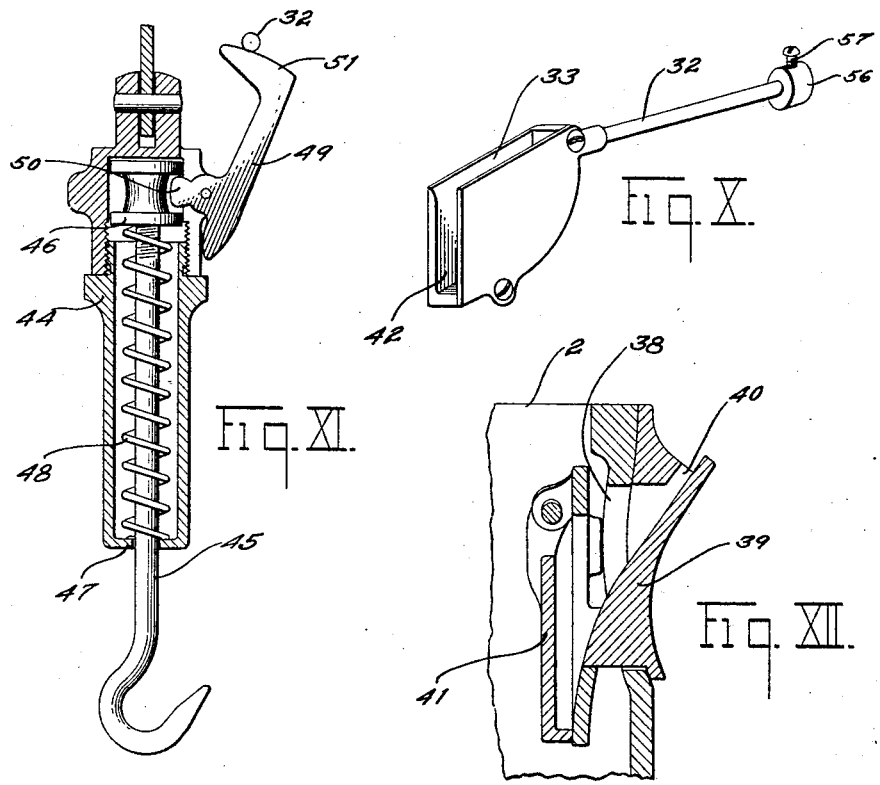
Inventor
Halvor O. Hem.
By C. O. Marshall
Attorney Patented July 3, 1928.

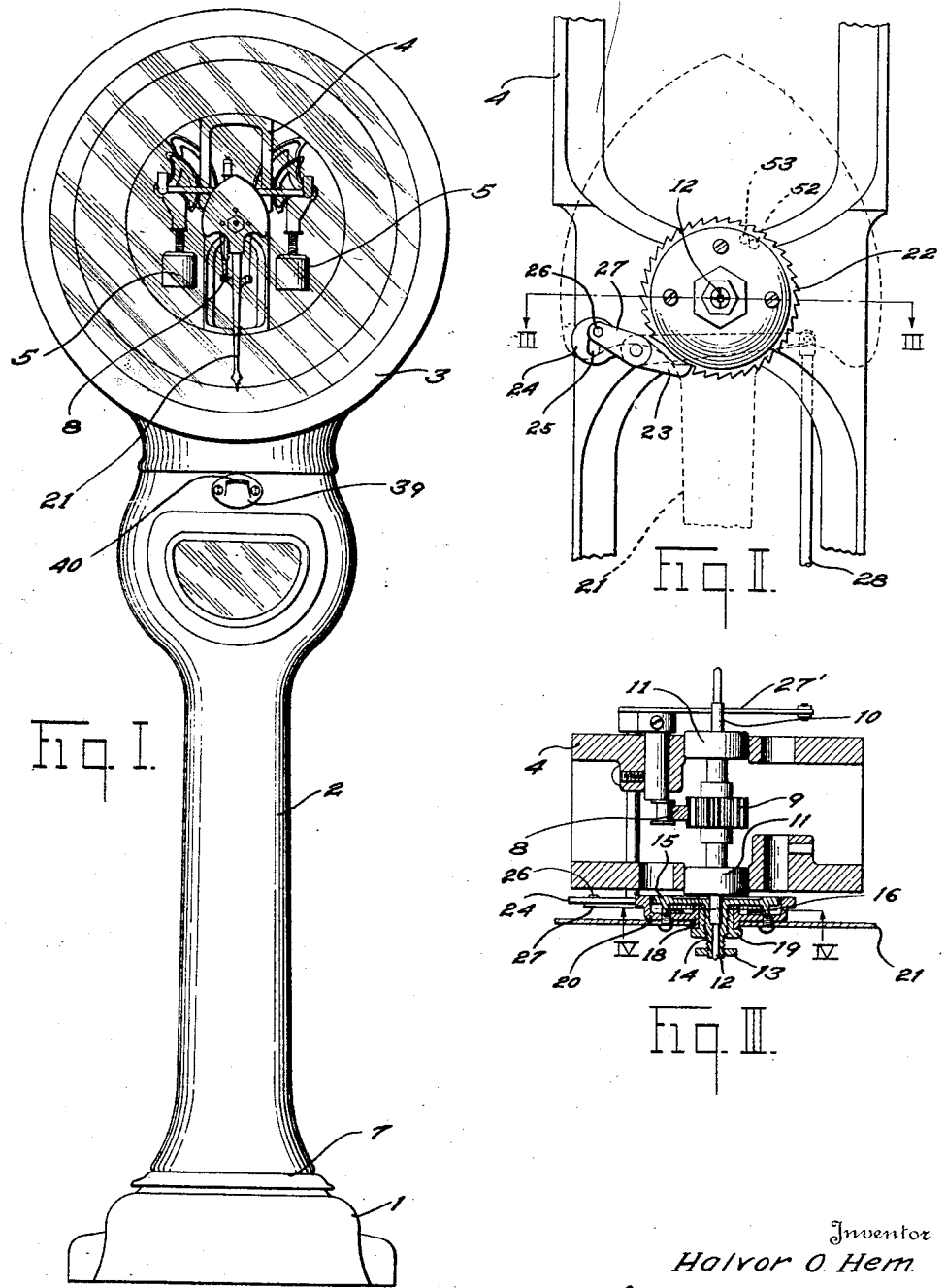

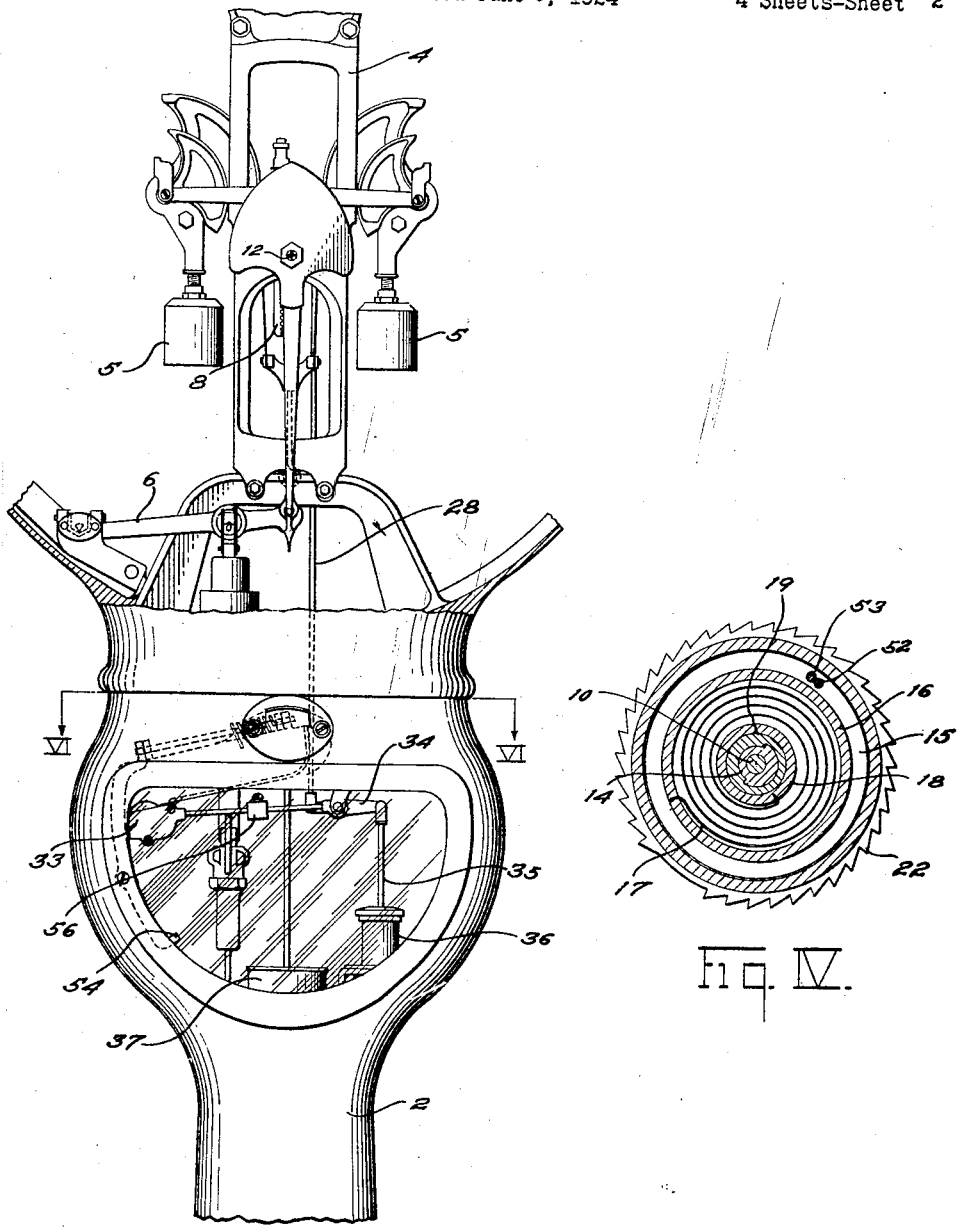

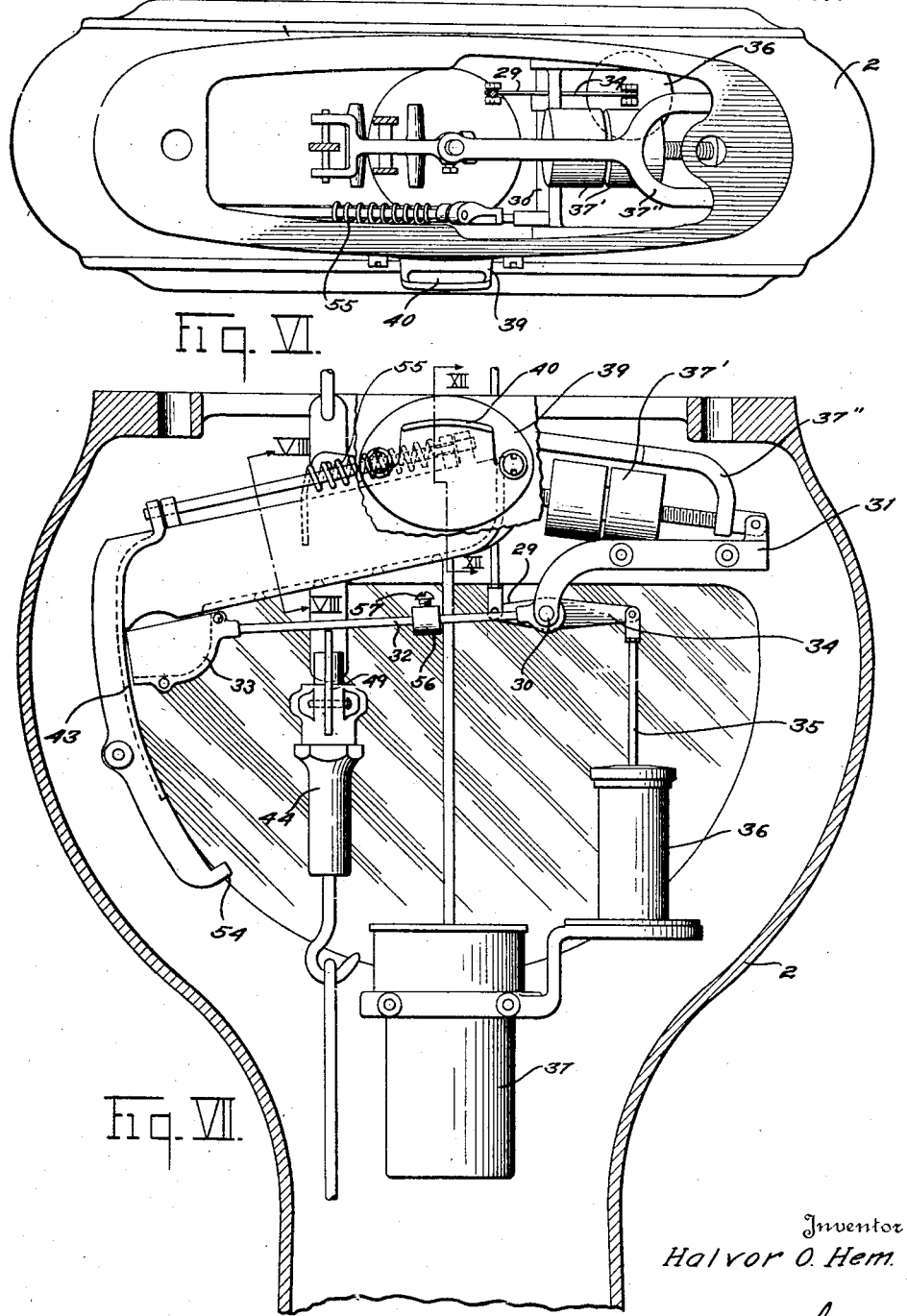

1,675,975

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

COIN-OPERATED WEIGHING SCALE.

Application filed June 9, 1924. Serial No. 718,735.

This invention relates to weighing scales, and particularly to coin-controlled devices for rendering them operative, and one of its principal objects is the provision of a device of this kind from which irregular objects, such as flat sided slugs, pieces of wire, etc., which may have been mischievously inserted in the coin slot, may be readily discharged.

Another object of the invention is the provision of an improved coin-controlled locking means adapted to be incorporated in a well-known existing type of weighing scale with a minimum of change in the existing mechanism.

Another object of the invention is the provision of an improved coin-controlled device which normally holds the indicating mechanism of an automatic scale in locked position but permits the automatic load-counterbalancing mechanism to operate when a load is applied to the scale platform and unlocks the indicating mechanism only when a load is placed on the platform and a coin deposited.

Another object is the provision of an improved coin-controlled means for locking the indicating mechanism of an automatic scale in combination with means operative when a coin is deposited to move the indicating mechanism to a position determined by the previously assumed position of the automatic load-counterbalancing mechanism of the scale.

Another object is the provision of an improved coin-controlled device of this character which is economical and compact in construction, certain in operation, and which operates without affecting the accuracy of the weighing mechanism of the scale.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a scale embodying my invention;

Figure II is an enlarged fragmentary elevational view showing a portion of the locking mechanism for the scale indicator;

Figure III is a sectional plan view taken substantially on the line III—III of Figure II;

Figure IV is a further enlarged sectional elevational view taken substantially on the line IV—IV of Figure III;

Figure V is a fragmentary elevational view showing in general the assembly of the coin-controlled locking mechanism and its relation to the weighing mechanism;

Figure VI is an enlarged sectional plan view taken substantially on the line VI—VI of Figure V;

Figure VII is an elevational view of the coin control mechanism, a part of the housing being shown in section;

Figure VIII is a sectional view through the coin chute taken substantially on the line VIII—VIII of Figure VII;

Figure IX is a bottom plan view of the coin chute open to discharge a slug or other object not capable of operating the locking device;

Figure X is a perspective view of a coin bucket forming an element of my invention;

Figure XI is a view, partly in section, showing means for preventing operation of the device except when a load is applied to the platform of the scale; and Figure XII is a sectional view taken substantially on the line XII—XII of Figure VIII, showing a part of the coin chute and a coin slot opening thereinto.

Referring to the drawings in detail, the scale in connection with which I have shown my mechanism is a person weigher of a well-known type, having a base 1 which supports a column 2 and a substantially watch-case-shaped head 3, within which is supported a frame 4 that carries automatic load-counterbalancing mechanism, consisting of a pair of oppositely swinging pendulums 5 connected by means of a lever 6 and suitable linkage to the load-receiving platform 7 of the scale. Since the load-counterbalancing mechanism is of the well-known type described in the United States patent to Hapgood No. 1,203,611, I shall not describe it here in detail. When a person steps upon the platform 7 of the scale the lever 6 and the linkage connecting the platform levers and pendulums 5 is pulled downwardly, causing the pendulums 5 to swing outwardly and upwardly until the load on the scale platform is counterbalanced.

Connected with the pendulums 5 so as to be moved vertically upwardly as the pendulums swing to counterbalance a load is a rack bar 8 (see Figures I, III and IV) which meshes with a pinion 9 fixed upon a shaft 10 that is mounted in anti-friction bearings 11 in the frame 4, so that as the pendulums swing upwardly the pinion 9 and the shaft 10 are caused to rotate. The forwardly projecting end of the shaft 10 is square, as shown at 12 in Figures II and III, and clamped upon the forward end of the shaft by means of a nut 13 is a threaded split collar 14, at the rear end of which is an integral plate 15. Adjacent the outer edge of the plate 15 is an integral forwardly extending flange 16, to which is fastened one end of a spiral spring 17.

The other end of the spring 17 is fastened to a bushing 18 which is rotatably mounted upon a threaded sleeve 19 which is threaded upon the collar 14. Integral with the bushing 18 and extending outwardly therefrom is a plate 20, to which is secured the indicator hand 21 of the scale, and the outer edge of the plate 20 is provided with ratchet teeth 22 which are normally engaged by a pawl 23 so that the plate 20 and indicator hand 21 are prevented from rotating in a clockwise direction with the shaft 10 when the shaft is rotated by a load upon the scale platform.

The pawl 23 which is pivoted upon the frame 4 is provided with a tail 24 in which is a slot 25 receiving a pin 26 projecting laterally from the end of a finger 27 which is fixed upon a shaft journaled in the frame 4 and upon which the pawl 23 is pivotally mounted. An arm 27', also fixed to the said shaft, is connected to a rod 28 which extends downwardly into the upper end of the column 2, where it is pivotally connected to an arm 29 which is fixed to a shaft 30 that is journaled in a bracket 31 mounted inside the upper end of the column 2. A second arm 32 is also fixed at one end upon the shaft 30 and carries at its free end a coin bucket 33, and a third arm 34, which in the illustrated embodiment of the invention is shown as integral with the arm 29, extends from the shaft 30 in a direction opposite to that of the arms 29 and 32 and is connected to the plunger rod 35 of a dash pot device 36.

The dash pot 37 shown in Figures V and VII is the well-known weighing scale dash pot intended to damp the oscillations of the weighing mechanism, and the balancing balls 37' and the member 37'' on which the balls 37' are mounted are also parts of the weighing mechanism intimately connected with my coin-controlled locking device. Since the construction of these parts and the means of connecting them to the weighing mechanism are well known in the art, they will not be here described.

The upper end of the column 2 is provided with an opening 38 (see Figure XII), and secured upon the front of this column and extending into the opening 38 is a member 39 having a coin slot 40 which leads into one end of a coin chute 41, the other end of which terminates immediately above the bucket 33. The bucket 33 is open at one end, as shown at 42 in Figure X, and this end of the bucket is positioned immediately adjacent a curved wall 43 (shown in dotted lines in Figure VII) which extends downwardly from the end of the coin chute 41 and terminates some distance below the bucket.

Interposed in the linkage connecting the scale platform and the pendulum load-counterbalancing mechanism are a tubular member 44, the upper end of which is connected to the pendulum mechanism, and a link 45, the lower end of which is connected to the platform. The upper end of the link 45 extends into the tubular member 44 and is provided at its upper end with a head 46 between which and an inwardly extending flange 47 at the lower end of the tubular member 44 is interposed an expansive spring 48. Pivoted at the upper end of the tubular member 44 is a dog 49 having a foot 50 which extends through the wall of the tubular member 44 into an annular recess in the head 46. The nose 51 of the dog 49 normally lies immediately below the arm 32.

When in the operation of my device a person steps upon the scale platform 7 the link 45 is pulled downwardly against the tension of the spring 48 and as the head 46 of the link 45 moves downwardly the dog 49 is swung from under the arm 32. The interposition of the extensible member 44—45 in the linkage connecting the platform and the pendulum mechanism does not affect the final pull upon the pendulum mechanism and the pendulums 5 swing upwardly and outwardly to counterbalance the load. The rack 8 moves upwardly and the pinion 9 and shaft 10 revolve, carrying around with them the plate 15, thus winding up the spring 17. The plate 20 and indicator hand 21 are, however, held against movement by the pawl 23, so that no indication of the weight of the person is given. If, now, a coin be inserted in the slot 40, it will fall into the coin chute 41 and thence roll downwardly and to the left to the opposite end of the chute, from whence it will fall into the coin bucket 33. The arm 32 with the other parts fixed to the shaft 30 are very nearly in balance in the upper position of the arm, so that the weight of the coin will swing the arm 32 and the parts fixed to the shaft 30 about the axis of the shaft; the downward movement of the arm being permitted by reason of the fact that the dog 49 has moved from beneath it but being retarded by the dash pot device 36. As the arm 32 swings downwardly the arm 29, which is also fixed to the shaft 30, swings downwardly with it and acting through the rod 28 causes the finger 27 to swing upwardly about its pivot until the lower end of the slot 25 engages the pin 26 on the tail 24 of the pawl 23 and moves the pawl out of engagement with the ratchet teeth on the plate 20. Acting under the influence of the spring 17 the plate 20 then revolves on the threaded sleeve 19 until its movement is halted by engagement of stops 52 and 53 mounted respectively on the plates 15 and 20, the stops being so located that when they are in engagement the weight of the load on the scale platform 7 will be indicated by the indicator hand 21.

After the coin has passed from the coin bucket 33, further downward movement of the bucket 33 is prevented by a stop 54 and as the parts fixed to the shaft 30 are slightly overweighted the arm 32 will again swing upwardly to its original position, its return movement being, of course, retarded by the dash pot device 36. As the arm 32 returns to its original position the pawl 23 will again swing into engagement with the ratchet teeth on the plate 20 and further weighing on the scale will be prevented, though the indicator hand will not be moved out of the position in which it stands when the pawl and ratchet again come into engagement. When the load is removed from the platform and the pendulums and rack descend the plate 15 will revolve to its original position and, by virtue of engagement of the stop 52 carried by the plate 15 with the stop 53 carried by the plate 20, it will carry the plate 20 with it. This return movement of the plate 20 is permitted by reason of the fact that the pin 26 may move in the slot 25 sufficiently to permit the pawl to ride over the ratchet teeth on the plate 20, and in order that the hand may return to zero position if it swings slightly beyond in its return movement some of the teeth on the portion of the periphery of the plate 20 which passes over the pawl after the hand has passed zero position are omitted.

If a coin is placed in the coin slot 40 before the person steps upon the scale platform it will roll through the chute and drop into the coin bucket, but the coin bucket will be prevented from descending and carrying the arm 32 downwardly with it by engagement of the arm 32 with the nose 51 of the dog 49 and the locking mechanism will not operate until the dog has been moved from beneath the arm 32 by the weight of a load on the platform. It makes no difference, therefore, whether the coin be deposited before the person steps on the platform or afterward.

It sometimes happens that coin-controlled devices of this character are clogged by means of slugs, hairpins, paper clips and other non-circular objects which may pass through the coin slot but which will not roll along the chute. In order to avoid the necessity of disassembling or partially disassembling the scale and coin-controlled mechanism, I have hinged the rear side of the coin chute as shown in Figures VIII, IX and XII, so that in case the device becomes clogged it is only necessary to insert a wire or other thin member in the coin slot 40 and push the rear side of the coin chute rearwardly so that the obstruction may drop out. In order to insure the return of the rear side of the coin chute to operative position, I have provided a spring 55 which immediately swings the rear side of the chute back to position when the pushing member is withdrawn.

In order that the scale may be easily adjusted to operate with coins of a particular weight, I have provided the arm 32 with a poise 56 which may be moved toward or away from the pivot of the arm and which is held in adjusted position by means of a set screw 57. By moving this poise toward the bucket 33 the effect of its weight may be increased to an extent which will make the device operable by a very light coin. If the poise be moved to a point adjacent the other end of the arm 32, a comparatively heavy coin will be required to operate the device. It may thus be set to operate upon the insertion of a cent or it may be set so that a weight equivalent to the weight of a nickel is required to operate it. By making the coin chute of proper dimensions and properly adjusting the poise 56 I am in practice able to make a scale which may be operated by the insertion of an English penny or by the insertion of two English half-pennies but which will not operate upon the insertion of one English half-penny. When the scale is properly adjusted it may be operated by the insertion of an English penny even if the penny be very thin and old, while in the same adjustment it will not operate upon the insertion of a single half-penny even though the half-penny be new and of full weight. It will, however, operate upon the insertion of two half-pennies even though they be old and thin.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, an arm adapted to be moved downwardly by the weight of a coin, a connecting member consisting of two sections longitudinally movable relatively to each other, a dog pivoted to one of said sections and extending to a position under said arm, means whereby said dog is moved from position under said arm by relative movement of said sections, and resilient means yieldably holding said sections against relative movement.

2. In a device of the class described, in combination, weighing mechanism, a connecting member adapted to be operated by said weighing mechanism, said connecting member carrying a dog, an arm adapted to be actuated by the weight of a coin, said dog adapted to restrain the movement of said coin actuated arm when the weighing mechanism is inoperative, and means whereby said dog is moved to permit said arm to pass said dog upon operation of said weighing mechanism.

3. In a device of the class described, in combination, a member adapted to be actuated by the weight of a coin, a connecting member located adjacent said coin actuated member, means carried by said connecting member for normally restraining movement of said coin actuated member, and means whereby movement of said connecting member operates to permit said coin actuated member to pass said restraining means.

4. In a device of the class described, in combination, weighing mechanism, a two-section connecting member operatively connected to said weighing mechanism, an arm adapted to be actuated by the weight of a coin, one section of said connecting member being located adjacent said arm and carrying a dog, said dog adapted to normally restrain movement of said coin actuated member, and means whereby said dog is withdrawn from restraining position upon movement of the other section of said connecting member.

HALVOR O. HEM.